United States Patent Office 3,213,032
Patented Oct. 19, 1965

3,213,032
PROCESS FOR SINTERING URANIUM NITRIDE WITH A SINTERING AID DEPRESSANT
Joseph P. Hammond, Knoxville, Tenn., assignor to the United States of America as represented by the United States Atomic Energy Commission
No Drawing. Filed Nov. 13, 1964, Ser. No. 411,166
9 Claims. (Cl. 252—301.1)

The present invention relates to an improved process for sintering uranium nitride to high densities.

The excellent physical and nuclear properties of uranium nitride mark it as an excellent fuel for use in high temperature, high power density nuclear reactors. Because of the high uranium content of uranium nitride, it can be substituted for $UO_2$ in a fuel element and occupy about 30% less volume at an equivalent uranium content. Its high thermal conductivity (on a par with UC), high melting point and acceptable chemical compatibility are further recommendations for use as a nuclear fuel. However, the complete utilization of this material in current commercial power reactors is at least partly contingent upon the overall economy associated with its fabrication. One of the principal cost factors in using uranium nitride as a fuel is involved in its fabrication into a densified compact.

Up to now, the sintering of uranium nitride compacts to obtain usefully high densities has been fraught with difficulty and thought to be well-nigh impractical. Dense, substantially pure stoichiometric uranium mononitride cannot be produced by normal casting or sintering techniques because it begins to decompose at about 1600° C. in vacuum and at somewhat higher temperatures in inert atmospheres. Sintering of uranium nitride in a nitrogen atmosphere would appear to represent a logical approach as a means of inhibiting the decomposition of uranium nitride at temperatures above 1600° C. While this may inhibit its decomposition, uranium nitride combines with nitrogen at temperatures below about 1200° C. to form higher nitrides of uranium according to the equation $$UN + N_2 \rightarrow UN_x$$

where $x > 1$. Since the specific gravity of the higher nitrides is lower than that of UN, compacts of UN spall and disintegrate during the sintering cycle, thus making it difficult to reach usefully high densified compacts. That dense UN bodies are not easily obtained is confirmed by contemporary workers in the art. For example, D. L. Keller et al., in an article entitled, "Powder Metallurgy of UC and UN," which appears in the 4th Plansee Proceedings, 1961, pages 304–327, report that little significant densification is achieved at temperatures low enough to prevent UN decomposition. They report that vacuum sintering results in a compact consisting of a matrix of free uranium, a result which restricts the use of such a composition to well below the melting point of uranium. The highest attained vacuum sintered density, 80% of theoretical, was obtained from a ten-hour sinter at 1650° C. of fine UN powder.

It is, accordingly, an object of this invention to provide a method which allows sintering of UN compacts to sintered densities approaching the theoretical density of UN.

Another object is to provide a method of vacuum sintering UN compacts while avoiding adverse decomposition thereof.

The objects and advantages of this invention are realized by sintering a compact of uranium nitride which contains a uniformly dispersed uranium intermetallic compound. The uranium intermetallic enhances the sinterability of uranium nitride to allow production of UN compacts having a density in excess of 90% of the theoretical density of UN. The uranium intermetallic compound suitable for use in the present invention as a sintering aid is one wherein the non-uranium containing component is volatile at the vacuum sintering temperature or is soluble in the UN matrix. The operative sintering temperature is between 1400° and 1800° C. Beyond 1800° C. the beneficial effect of the sintering additive is countervailed by the decomposition rate of UN. While useful densities may be achieved at temperatures as low as 1400° C., it is preferred to sinter at a temperature in the range 1500°–1600° C.

The effective amount of sintering aid necessary to enhance sintering will vary according to the selected sintering aid. Among the uranium intermetallic compounds which are useful as sintering aids are uranium aluminides such as $UAl_2$, $UAl_3$, and $UAl_4$; uranium silicides such as USi, $USi_2$ and $U_3Si_2$; and uranium beryllides such as $UBe_{13}$. An effective amount of selected sintering aid is that amount which will achieve a final UN sintered density which is higher than that achieved in the absence of said sintering aid under the same sintering schedule. In the case of $UAl_2$, for example, an effective amount has been found to run from 2 to 8 percent by weight of uranium nitride. Greater amounts of $UAl_2$ result in retention of excessive secondary constituent.

The procedure used to obtain the benefit of increased sintered density is in accordance with standard operational powder metallurgy technique and consists of uniformly blending a powder of UN with a powder of the selected sintering aid and an organic binder, pressing the mixture to a desired green strength, and then vacuum sintering the green composite.

The preparation of UN may be carried out in a number of ways such as (1) by passing nitrogen or ammonia over uranium metal, (2) by vacuum decomposition or hydrogen reduction of higher nitrides, or (3) by reaction of higher nitrides with uranium under nitrogen pressures. The intermetallic powders, e.g., $UAl_2$, are prepared by standard procedures of non-consumably arc-melting from elemental constituents.

It is preferred that the UN in the initial reaction mixture be as fine as possible since the particle size has a definite effect on the attained sintered density. The finer the particle size, the higher the finally attained sintered density will be. However, control of particle size alone in the absence of the selected sintering aid depressant will not result in sintered densities much above 80% of the theoretical density of UN. The uranium intermetallic sintering aid should also be in powder form with a particle size of the same magnitude as the UN. The two powders are mixed in desired proportions with petroleum ether having dissolved therein camphor equivalent to about 2 wt. percent of the UN present. The ether is evaporated leaving a camphor-coated UN–U intermetallic mixture. A quantity of the camphor-coated mixture is then cold pressed as, for example, in a double-acting steel die at a pressure of about 27 t.s.i. to produce a green compact having 65–70% of UN theoretical density. The resulting green compacts are then placed on a tungsten pedestal in a tungsten-lined graphite or tantalum crucible. The crucible is placed in a resistance heated vacuum furnace. A typical heating schedule involves (a) an initial rise to 300° C. for 5 hours to remove the camphor, (b) a temperature rise rate of 450° C. per hour until the desired sintering temperature is reached, (c) time at sintering temperature of 2 to 4 hours while maintaining a vacuum of $10^{-6}$ to $10^{-7}$ torr, and (d) cooling at a rate of 300° C. per hour.

EXAMPLE

Using the general procedure described above, UN powder having an average as-received particle size of 3.6 microns (as measured by Fisher Subsieve Analyzer) was ball milled in a rubber-lined mill and dry blended with uranium aluminide ($UAl_2$) powder having an average particle size of about 3 microns. Separate uniform mixtures of UN containing 2, 4, 6, and 8 wt. percent $UAl_2$, respectively, were prepared. Each batch was mixed with a solution of camphor, dried, pressed to a green density of about 67% of the theoretical of UN, and then vacuum sintered at temperatures from 1400°–1600° C. The results are summarized in the table below.

*Table*

| Additive and Amount | Powder Condition | | Sintered Density (Percent of UN Theoretical) | | | |
|---|---|---|---|---|---|---|
| | Milling | Size[2] | 1,400° C. | 1,500° C. | 1,550° C. | 1,600° C. |
| None | As received.[1] | 3.6 | | 61.5 | 65.0 | 70.5 |
| 2 wt. percent $UAl_2$ | 16 hrs | 3.2 | 83.2 | 89.3 | | |
| 2 wt. percent $UAl_2$ | 48 hrs | 2.8 | | | | 95.2 |
| 4 wt. percent $UAl_2$ | 16 hrs | 3.2 | 85.0 | 90.2 | | |
| 4 wt. percent $UAl_2$ | 48 hrs | 2.8 | | | | 93.3 |
| 6 wt. percent $UAl_2$ | 16 hrs | 3.2 | 84.5 | 88.5 | | |
| 6 wt. percent $UAl_2$ | 48 hrs | 2.8 | | | | 92.0 |
| 8 wt. percent $UAl_2$ | 16 hrs | 3.2 | 83.8 | 86.5 | | |
| 8 wt. percent $UAl_2$ | 48 hrs | 2.8 | | | | 87.6 |
| .5 wt. percent $U_3Si_2$ | 48 hrs | 2.8 | | | 91.8 | 92.6 |
| 1.5 wt. percent $U_3Si_2$ | 48 hrs | 2.8 | | | 90.6 | 93.8 |

[1] Supplied by the Numec Corporation.
[2] As determined by Fisher Subsieve Analysis.

It will be noted that the attained sintered densities are appreciably higher as compared to vacuum sintered UN bodies previously reported in the contemporary literature. X-ray diffraction and metallographic examination showed each of the sintered specimens, prepared as above, to be essentially an all-uranium nitride structure with only small amounts of a secondary phase as isolated isometric particles, thought to be, but not positively identified as, uranium-rich phase. In the instances which gave highest theoretical density, such as for the 2 and 4 wt. percent $UAl_2$ additions with 1600° C. sintering the amount of secondary phase was but of trace magnitude as determined by metallographic inspection.

What is claimed is:
1. A method of preparing a densified compact of uranium nitride which comprises uniformly mixing uranium nitride powder with an effective amount of a uranium intermetallic compound, pressing said mixture to a desired green strength and then sintering the resulting compact at a temperature in the range 1400–1800° C.
2. The method according to claim 1 wherein the UN–U intermetallic compact is sintered in vacuum.
3. The method according to claim 1 wherein the UN–U intermetallic compact is sintered in an inert atmosphere.
4. The method according to claim 1 wherein the UN–U intermetallic compact is sintered in a nitrogen atmosphere.
5. The method according to claim 1 wherein the UN–U intermetallic compact is sintered at a temperature in the range 1400°–1600° C.
6. The method according to claim 1 wherein the uranium intermetallic compound is selected from $UAl_2$, $UAl_3$, $UAl_4$, $UBe_{13}$, $USi$, $USi_2$, $U_3Si_2$, and $USi_3$.
7. The method according to claim 1 wherein the non-uranium component of the uranium intermetallic is volatile at the sintering temperature.
8. The method according to claim 1 wherein the non-uranium component of the uranium intermetallic is soluble in the UN matrix phase at the sintering temperature.
9. A method of preparing a densified compact of uranium nitride which comprises uniformly mixing uranium nitride powder with an effective amount of a uranium intermetallic compound, contacting said mixture with a solution of an organic solvent containing camphor dissolved therein, removing excess solvent, pressing said camphor-coated mixture to a desired green strength and then sintering the resulting compact at a temperature in the range 1400–1800° C.

References Cited by the Examiner

FOREIGN PATENTS 1,267,860   6/61   France.

CARL D. QUARFORTH, *Primary Examiner.*